(12) United States Patent
Ying et al.

(10) Patent No.: US 6,388,897 B1
(45) Date of Patent: May 14, 2002

(54) DC-TO-DC CONVERTER AND METHOD FOR CONVERTING DIRECT CURRENT TO DIRECT CURRENT

(75) Inventors: Jianping Ying; Chau-Chun Wen; Hai Geng; Jianhong Zeng, all of Neihu Taipei (TW)

(73) Assignee: Delta Electronics, Inc., Taoyan Hsien (TW)

(*) Notice: Subject to any disclaimer, the term of this patent is extended or adjusted under 35 U.S.C. 154(b) by 0 days.

(21) Appl. No.: 09/865,220

(22) Filed: May 25, 2001

(30) Foreign Application Priority Data

Nov. 30, 2000 (TW) ........................................ 89125523 A

(51) Int. Cl.[7] .............................................. H02M 3/335
(52) U.S. Cl. ........................................ 363/17; 363/127
(58) Field of Search .............................. 363/15, 16, 17, 363/78, 81, 84, 95, 98, 131, 132, 127; 323/255, 258, 340

(56) References Cited

U.S. PATENT DOCUMENTS 5,351,179 A * 9/1994 Tsai et al. ..................... 363/53
5,949,658 A * 9/1999 Thottuvelil et al. ........... 363/15
5,991,169 A * 11/1999 Kooken ........................ 363/17
6,115,276 A * 9/2000 Mao ........................... 363/127
6,113,825 A * 10/2000 Imamura et al. .............. 363/17
6,185,111 B1 * 2/2001 Yoshida ....................... 363/17

* cited by examiner

Primary Examiner—Adolf Deneke Berhane
(74) Attorney, Agent, or Firm—Klein & Szekeres LLP

(57) ABSTRACT

A DC-to-DC converter and a method thereof is provided. The DC-to-DC converter includes a power supply for providing a first direct current, a first capacitor, a first switch assembly for converting the first direct current into a first alternating current, a transformer for converting the first alternating current to a second alternating current, a rectifying circuit for converting and rectifying the second alternating current to a second direct current, a filtering circuit, and a range winding assembly for adjusting the output voltage of the second direct current in response to the voltage drop of the first direct current.

25 Claims, 6 Drawing Sheets

(a) T2

(b) T3

(c) T4

(d) T5

(e) T6

(f) T7

DC-TO-DC CONVERTER AND METHOD FOR CONVERTING DIRECT CURRENT TO DIRECT CURRENT

FIELD OF THE INVENTION

The present invention relates to a DC-to-DC converter and a converting method, and more particularly to a DC-to-DC converter and a converting method for adjusting a turn ratio of a transformer in order to maintain an output DC voltage during a hold-up time in response to a voltage drop of an input DC voltage.

BACKGROUND OF THE INVENTION

Presently, the traditional topological structure of DC-to-DC converter is mainly divided into four types: full-bridge converter, forward converter, flyback converter and asymmetrical half-bridge converter.

FIG. 1 illustrates a circuit diagram of a conventional full-bridge topological DC-to-DC converter, wherein the power switching devices Q1 to Q4 are MOSFETs.

In view of FIG. 1, the DC-to-DC converter includes a direct current (DC) voltage Ud provided from the DC power supply or obtained from a rectified AC power supply, a filtering energy storage capacitor C1, a switch assembly Q1 to Q4, a transformer T1, two rectifying diodes D2 and D3 and a filtering circuit LC having a capacitor C3 and an inductor L2. The filtering energy storage capacitor C1 is charged by the DC voltage Ud provided from the DC power supply or obtained from a rectified alternating current (AC) power supply. The input DC voltage is converted into a high frequency AC voltage by alternately conducting and shutting the switch assembly Q1 to Q4. Furthermore, the high frequency AC voltage transformed by the transformer T1 is transferred to the secondary winding N2 and N2' in the transformer T1, which are rectified through the rectifying diodes D2 and D3 respectively and then a DC output voltage is outputted from the filtering circuit LC.

During normal operation, the maximum duty ratio in the switch assembly Q1 to Q4 is generally small. The small duty ratio is obtained so as to conform to a hold-up time in a power supply. When the input DC outputted from the power supply is dropped, a voltage outputted from the filtering energy storage capacitor C1 is decreased therewith. Nevertheless, the power supply is required to maintain a hold-up time, e.g. 20 ms, of rated output voltage of the converter after the input voltage drop. Consequently, the duty ratio of the converter is raised through the hold-up time, for example the duty ratio is raised from 70% of working normally to 90%, thereby the limited output voltage of the converter is performed.

The duty ratio of the converter is less during the normal operation, and hence the efficiency of the converter could not be increased. Moreover, the converter needs a larger filtering energy storage capacitor C1 to maintain the rated output voltage, which increases the volume of the converter and the price thereof. In addition, voltage on the secondary winding of the transformer T1 should be raised due to the less duty ratio and the stress generated from the rectifying diodes D2 and D3 would be increased.

Furthermore, other topological structures of the DC-to-DC converter also exist the above-mentioned shortcomings according to the prior art. It is therefore tried by the applicant to deal with the above situation encountered by the prior art.

SUMMARY OF THE INVENTION

It is therefore an object of the present invention to provide a DC-to-DC converter and a method for keeping a rated output voltage by adjusting the turn ratio of a transformer when the input voltage outputted from a power supply is dropped.

It is another object of the present invention to provide a DC-to-DC converter and a method for converting direct current to direct current including a better converting efficiency by raising the duty ratio of a switch assembly during the normal operation.

According to an aspect of the present invention, the DC-to-DC converter includes a power supply, a first capacitor, a first switch assembly, a transformer, a rectifying circuit, a filtering circuit and a range winding assembly. The power supply is used for providing a first direct current (DC). The first capacitor is electrically connected to the power supply for being charged by the power supply. The first switch assembly is electrically connected to the first capacitor for converting the first direct current into a first alternating current by switching the first switch assembly. The transformer has a primary winding and a secondary winding for converting the first alternating current to a second alternating current, wherein the primary winding is electrically connected to the first switch assembly and the secondary winding has a tap. The rectifying circuit is electrically connected to the secondary winding for converting and rectifying the second alternating current to a second direct current. The filtering circuit is electrically connected to the rectifying circuit for filtering the second direct current. In addition, the range winding assembly is electrically connected to the secondary winding and is one portion of the secondary winding for adjusting the output voltage of the second direct current in response to the voltage drop of the first direct current.

Preferably, the power supply is a direct current (DC) power supply.

Preferably, the power supply is an alternating current (AC) power supply capable of providing the first direct current via rectifying.

Preferably, the first capacitor is a filtering capacitor.

Preferably, the first alternating current is a high frequency alternating current.

Preferably, the tap is a central tap.

Preferably, the rectifying circuit includes two first rectifying diodes electrically connected to two ends of the secondary winding, respectively.

Preferably, the filtering circuit includes an inductor and a second capacitor electrically connected to the tap.

Preferably, the range winding assembly includes two subwindings electrically connected with two ends of the secondary winding, respectively.

Preferably, the two subwindings are electrically connected with two second rectifying diodes, respectively, wherein the output ends of the two second rectifying diodes are connected together and electrically connected to the inductor of the filtering circuit.

Preferably, the DC-to-DC converter further includes a third rectifying diode electrically connected to the range winding assembly, and a second switch electrically connected between the third rectifying diode and the filtering circuit.

Preferably, the DC-to-DC converter further includes a control circuit electrically connected to the second switch for controlling the second switch in response to the voltage drop.

Preferably, the control circuit is electrically connected to the first capacitor for providing a control signal to switch the second switch in response to the voltage drop of the first capacitor when the first direct current outputted from the power supply is dropped.

Preferably, the control circuit is electrically connected to the secondary winding of the transformer for providing a control signal to switch the second switch in response to the voltage drop of the secondary winding when the first direct current outputted from the power supply is dropped.

Preferably, the DC-to-DC converter is one selected from a group consisting of a flyback converter, a forward converter and a half-bridge converter.

According to another aspect of the present invention, the DC-to-DC converter includes a power supply for providing a first direct current (DC), a first capacitor electrically connected to the power supply for being charged by the power supply, a first switch assembly electrically connected to the first capacitor for converting the first direct current into a first alternating current by switching the first switch assembly, a transformer having a primary winding electrically connected to the first switch assembly and a second winding for converting the first alternating current into a second alternating current, a rectifying circuit electrically connected to a first end of the secondary winding for converting and rectifying the second alternating current to a second direct current, a filtering circuit having an inductor and a second capacitor for filtering the second direct current, wherein the inductor is electrically connected to the rectifying circuit, and the second capacitor is electrically connected to a second end of the secondary winding, a subwinding electrically connected to the first end of the secondary winding, a second rectifying diodes electrically connected to the subwinding, wherein the output end of the subwinding is electrically connected to the inductor of the filtering circuit, a second switch electrically connected between the subwinding and the filtering circuit, and a control circuit electrically connected to the second switch for controlling the second switch to be turned on when the voltage of the first direct current is dropped.

Preferably, the control circuit is electrically connected to the first capacitor for providing a control signal to switch the second switch in response to the voltage drop of the first capacitor when first direct current outputted from the power supply is dropped.

Preferably, the DC-to-DC converter is one selected from a group consisting of a flyback converter, a forward converter and a half-bridge converter.

According to another aspect of the present invention, the DC-to-DC converter includes a power supply for providing a first direct current (DC), a first capacitor electrically connected to the power supply for being charged by the power supply, a first switch electrically connected to the first capacitor for converting the first direct current into a first alternating current by switching the first switch assembly, a transformer having a primary winding electrically connected to the first switch and a second winding for converting the first alternating current into a second alternating current, a rectifying circuit electrically connected to the second winding for converting and rectifying the second alternating current to a second direct current, a filtering circuit having an inductor and a second capacitor, and electrically connected to the rectifying circuit for filtering the second direct current, a second switch having one end electrically connected to a central tap of the primary winding and the other end electrically connected to the first capacitor, and a control circuit for controlling the first switch and the second switch in response to the voltage drop of the first direct current outputted from the power supply.

Preferably, the control circuit is electrically connected to the first capacitor for providing a control signal to switch the second switch in response to the voltage drop of the first capacitor when first direct current outputted from the power supply is dropped.

Preferably, the DC-to-DC converter is one selected from a group consisting of a flyback converter, a forward converter and a half-bridge converter.

According to another aspect of the present invention, there is provided a method for converting direct current to direct current, adapted to be applied in a DC-to-DC converter. The method includes steps of charging a first capacitor, switching a first switch assembly for converting a first direct current outputted from the first capacitor into a first alternating current, converting the first alternating current to a second alternating current via a transformer, detecting whether the voltage of the first direct current is dropped, and adjusting the ratio of the windings for changing the output voltage of the second alternating current in response to the voltage drop, rectifying and converting the second alternating current into a second direct current via a rectifying circuit, and filtering the second direct current via a filtering circuit.

Preferably, the detecting step is performed by detecting the voltage drop of the first capacitor.

Preferably, the detecting step is performed by detecting the voltage drop of a second winding of the transformer.

Preferably, the adjusting step is performed by increasing the number of a second winding of the transformer.

Preferably, the adjusting step is performed by reducing the number of a primary winding of the transformer.

Preferably, the DC-to-DC converter is one selected from a group consisting of a flyback converter, a forward converter and a half-bridge converter.

The present invention may be well understood through the following descriptions with reference to the accompanying drawings, in which:

DETAILED DESCRIPTION OF THE PREFERRED EMBODIMENTS

Figure 1:
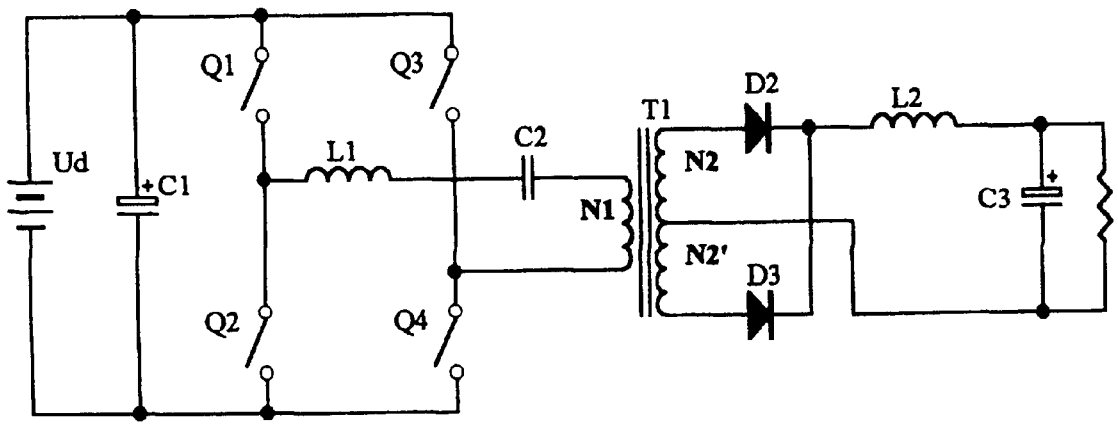
FIG. 1 is a circuit diagram of a full-bridge topological DC-to-DC converter according to the prior art.
Figure 2A:
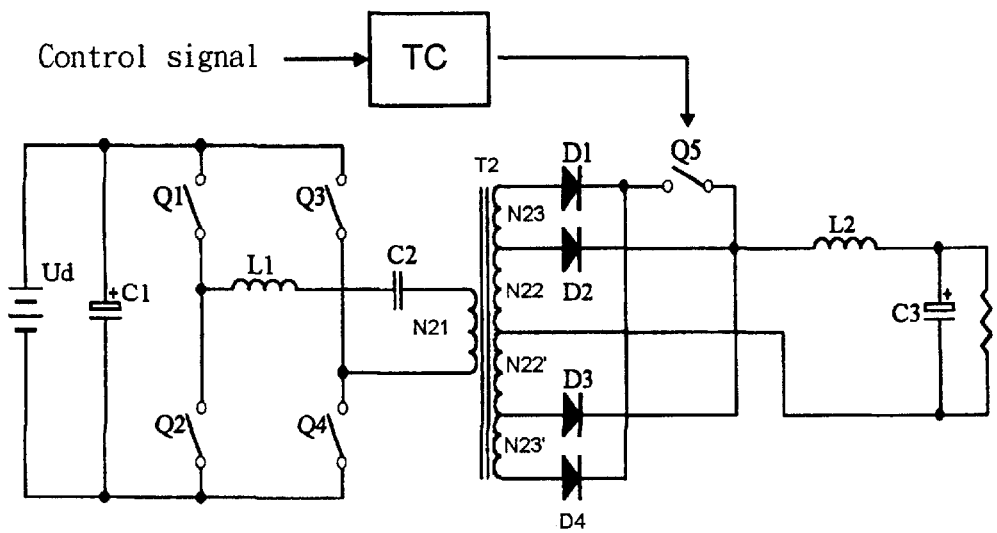
FIG. 2a is a circuit diagram of a full-bridge topological DC-to-DC converter according to the first preferred embodiment of the present invention.
Figure 2B:
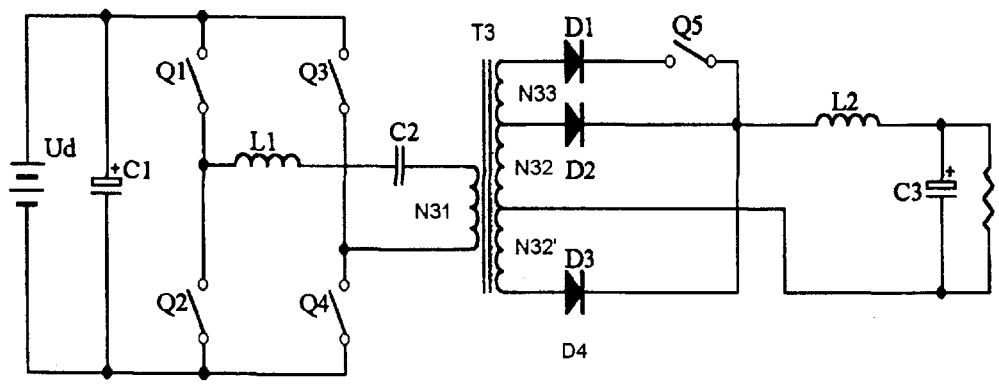
FIG. 2b is a circuit diagram of a full-bridge topological DC-to-DC converter according to the second preferred embodiment of the present invention.

FIGS. 2a and 2b are circuit diagrams according to the first and second embodiments of the present invention, wherein the circuits are developed on basis of the conventional DC-to-DC converter shown as FIG. 1. The circuit structures in FIGS. 2a and 2b are the same as that in FIG. 1 except that a range switch Q5 and a control circuit TC are introduced and the transformers T2 or T3 is different form T1.

The secondary winding of the transformer T2 includes a first secondary winding and a second secondary winding. The first secondary winding is a secondary winding of a central tap in the transformer T2 and includes two subwindings N22 and N22'. Moreover, a central tap of the first secondary winding is electrically connected to a capacitor C3 of a filtering circuit LC and two ends of the first secondary winding are electrically connected to the rectifying diodes D2 and D3.

Furthermore, the second secondary winding includes two subwindings N23 and N23'. The subwinding N23 in the second secondary winding is electrically connected to the subwinding N22 in the second secondary winding and the winding N23' in the second secondary winding is electrically connected to the subwinding N22' in the second secondary winding. Consequently, the subwindings N23 and N23' of the second secondary winding provide the function of changing the ratio of the transformer T2 and hence the second secondary winding also is called a range winding. Two subwindings N23 and N23' of the range winding are electrically connected to the second rectifying diodes D1 and D4, respectively. The output ends of the second rectifying diodes D1 and D2 are connected with each other and then connected to the range switch Q5. The range switch Q5 is connected to an inductor L2 of the filtering circuit LC. Therefore, the transformer T2 is also a variable ratio transformer because of adding a range winding therein.

The range switch Q5 could employ a power switching device such as MOSFET or IGBT, which is controlled to conduct or shut by a control circuit TC. A voltage drop could be detected by the control circuit TC. In normal operation, i.e. the input voltage of the power supply Ud is not dropped, the range switch Q5 would be shut. At that time, the adjusting ratio of the transformer T2 should be N21/N22 and N21/N22'. When the input voltage Ud is dropped, a voltage outputted from a filtering energy storage circuit C1 would be decreased. The limited output voltage of the original ratio of the transformer T2 would be not maintained under a predetermined threshold voltage, which is detected by the control circuit TC, and a control signal outputted from the control circuit TC is outputted to the range switch Q5, therefore, the range switch Q5 would be turned shut into conducting. At this time, the adjusting ratio of the transformer T2 would be decreased to N21/(N22+N23) and N21/(N22'+N23') and the output voltage of the secondary winding in the transformer T2 would be increased. Consequently, the rated output voltage outputted from the converter can be maintained during the hold-up time.

According to the above-mentioned description, the output voltage outputted from the transformer T2 is raised by adjusting the ratio thereof according to the present invention. Moreover, the 20 ms of rate output voltage could be maintained after the voltage drop, and the hold-up time problem is not required to be solved by raising the duty ratio of the switch assembly Q1 to Q4. Therefore, the duty ratio of the switch assembly Q1 to Q4 would be settled in high value, and the efficiency of the converter will be promoted.

In views of FIGS. 2a and 2b, a control signal outputted from the control circuit TC could be generated by detecting the decreased voltage either in the filtering energy storage capacitor C1 or in the secondary winding of the transformer T2. FIG. 2a does not show the connection relationships between the control circuit TC and the filtering energy storage capacitor C1 and between the control circuit TC and the secondary winding of the transformer T2.

FIG. 2b shows a full-bridge topological DC-to-DC converter according to the second preferred embodiment of the present invention. The difference in the circuit between FIG. 2a and FIG. 2b is that the ratio secondary winding of the transformer T3 has a subwinding N33 connected to a subwinding N32 of the first secondary winding and another subwinding N32' of the first secondary winding is not connected to the variable secondary winding. Nevertheless, the operation principle of FIG. 2b is the same with that of FIG. 2a.

Figure 3A:
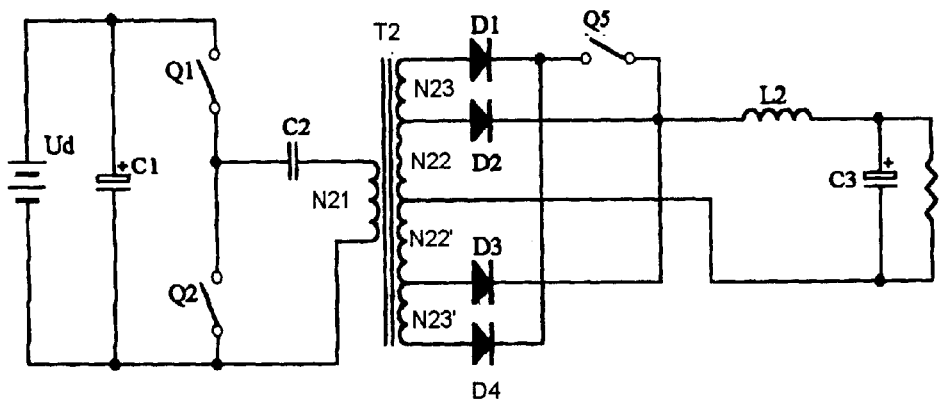
FIG. 3a is a circuit diagram of an asymmetrical half-bridge topological DC-to-DC converter according to the third preferred embodiment of the present invention.
Figure 3B:
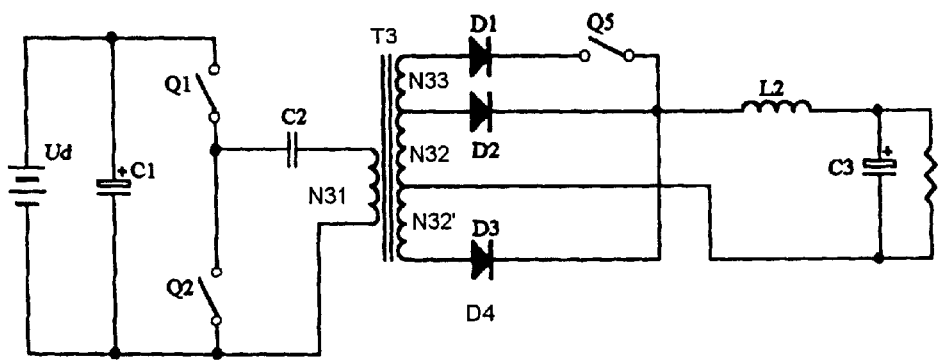
FIG. 3b is a circuit diagram of an asymmetrical half-bridge topological DC-to-DC converter according to the fourth preferred embodiment of the present invention.

FIGS. 3a and 3b illustrate the circuit diagrams of a half-bridge (as well as working under an asymmetric condition) topological DC-to-DC converter according to the present invention. The variable ratio transformers T2 and T3 shown in FIGS. 3a and 3b are equivalent to the variable ratio transformers T2 and T3 shown in FIGS. 2a and 2b. The half-bridge topological DC-to-DC converter also includes a control circuit TC, as shown in FIGS. 3a and 3b. The distinction between FIG. 2 and FIG. 3 is that the half-bridge topological circuit is used in FIG. 3, i.e. a switch assembly includes two switches Q1 and Q2 to construct the present half-bridge structure. Nevertheless, the adjusting ratio principle of FIG. 3 is identical to FIG. 2.

In the above-mentioned embodiments of FIG. 2 and FIG. 3, the output voltage outputted from the DC-to-DC converter would be raised by means of changing the ratio of the secondary winding to adjust the ratio of the transformer.

Figure 4A:
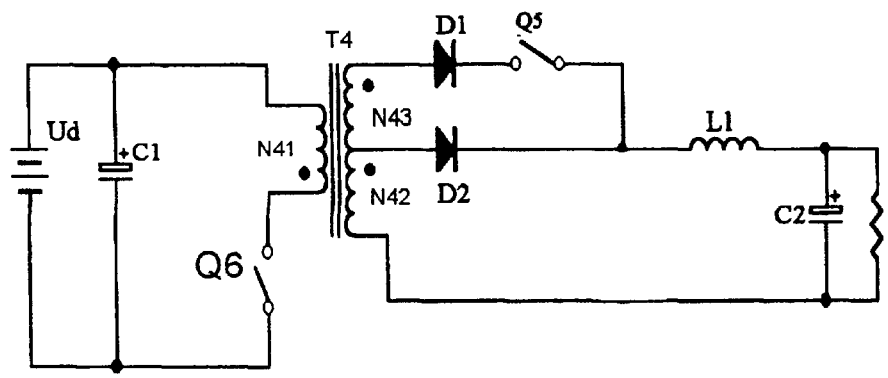
FIG. 4a is a circuit diagram of a flyback DC-to-DC converter according to the fifth preferred embodiment of the present invention.
Figure 4B:
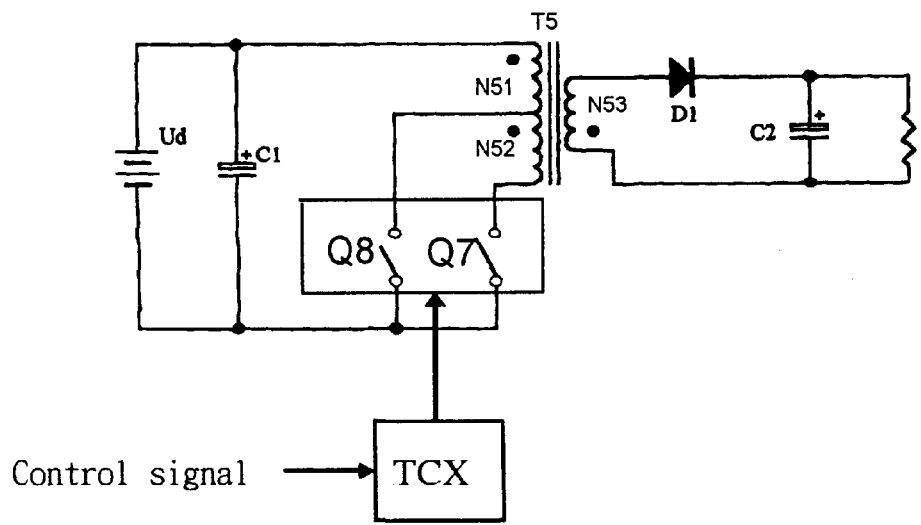
FIG. 4b is a circuit diagram of a flyback DC-to-DC converter according to the sixth preferred embodiment of the present invention.

FIGS. 4a and 4b illustrate circuit diagrams of a flyback DC-to-DC converter according to the present invention. In a view of FIG. 4a, the flyback excited DC-to-DC converter is implemented by employing a switch Q6. The switch Q6 is conducted and shut at a high frequency to convert a DC current to a high frequency AC current. A secondary winding of the variable ratio transformer T4 shown in FIG. 4a includes a first secondary winding N42 and a second secondary winding N43. The first secondary winding N42 is connected to the second secondary winding N43 in series. In addition, the second secondary winding N43 is connected to a range switch Q5 via a second rectifying diode D1 and connected to a filtering capacitor C2.

The power switching device such as MOSFET and IGBT would be used in the range switch Q5, which are controlled to be conducted or shut by a control circuit TC (not shown). In the normal operation, i.e. no input voltage drop, the range switch Q5 would be shut. The ratio of the transformer T4 is N41/N42 at present. When an input voltage outputted from the power supply Ud is dropped, the voltage of a filtering energy storage capacitor C1 is decreased. When the voltage of the filtering energy storage capacitor C1 is smaller than a predetermined threshold voltage, a rated output voltage would not be kept under the original ratio of the transformer T4. Furthermore, the voltage drop is detected by the control circuit TC and a control signal is outputted to the range switch Q5. Therefore, the range switch Q5 would be turned on. At the moment, the ratio of the transformer T4 would be decreased to N41/(N42+43) and the output voltage outputted from the secondary winding of the transformer T4 would be raised. Consequently, the converter can keep the rated output voltage during the hold-up time.

In accordance with the foregoing statements, the output voltage outputted from the transformer T4 would be raised through adjusting the ratio of the transformer T4 and the hold-up time, e.g. 20 ms, of rated output voltage outputted from the DC-to-DC converter would be maintained after the voltage drop according to of the present invention. Consequently, the duty ratio of the switch Q5 would be raised in the normal working status and the working efficiency of the converter would be enhanced.

In the embodiments shown in FIGS. 4a and 4b, the control signal outputted from the control circuit TC could be detected through detecting the decrease of the output voltage in the filtering energy storage capacitor C1 or through detecting the decrease of the output voltage in the secondary winding of the transformers T4 and T5.

FIG. 4b shows a circuit diagram of a flyback DC-to-DC converter according to the sixth preferred embodiment of the present invention. In a view of FIG. 4a, a means for adjusting the ratio of the transformer is performed by modulating the secondary winding of the transformer T4. The ratio of the transformer T5 is modulated by changing the primary winding of the transformer T5 to raise the output voltage thereof, as shown in FIG. 4b.

In a view of FIG. 4b, the primary winding of the transformer T5 includes a central tap (not shown) composed of two subwindings N51 and N52. One end of the subwinding N52 and the central tap are connected to a first switch Q7 and a second switch Q8, respectively. The DC-to-DC converter shown in FIG. 4b includes a control circuit TCX. The first switch Q7 and the second switch Q8 are controlled by the control circuit TCX in order to activate respectively under the different condition. The input voltage drop of the power supply Ud would be determined by the control circuit TCX. In a normal operation, i.e. when the input voltage Ud is not dropped, the second switch Q8 keeps shut and the first switch Q7 is activated for being conducted and shut at a high frequency to output a high frequency AC. Now, the ratio of the transformer T5 is (N51+N52)/N53. When the input voltage Ud is dropped, a voltage outputted from a filtering energy storage capacitor C1 would be decreased. When the voltage of the filtering energy storage capacitor C1 is smaller than a predetermined threshold voltage, the rated output voltage would not be kept under the original ratio of the transformer T5. Furthermore, the voltage drop is detected through the control circuit TCX to sent out a control signal to the first switch Q7 and the second switch Q8, and the first switch Q7 would be shut off and the second switch Q8 would be activated by conducting and shutting with the high frequency to output a high frequency AC. At this time, the ratio of the transformer T5 would be decreased to N51/N53 and the output voltage outputted from the secondary winding of the transformer T5 would be raised. Consequently, the converter can keep the limited output voltage during the hold-up time.

In accordance with the foregoing statements, the output voltage outputted from the transformer T5 would be raised through adjusting the ratio of the transformer T5 and the hold-up time, e.g. 20 ms, of rated output voltage outputted from the DC-to-DC converter would be maintained after a voltage drop according to the present invention. Consequently, the duty ratio of the switches Q7 and Q8 would be raised in the normal working status and the working efficiency of the converter would be promoted.

In the preferred embodiment of FIG. 4b, the input voltage drop signal outputted from the control circuit TCX could be detected through detecting the decrease of the output voltage outputted from the filtering energy storage capacitor C1 or through detecting the decrease of the output voltage outputted from the secondary winding of the transformer T5. FIG. 4b does not illustrate the connection relationship between the control circuit TCX and the filtering energy storage capacitor C1 and between the control circuit TCX and the secondary winding of the transformer T5.

Figure 5A:
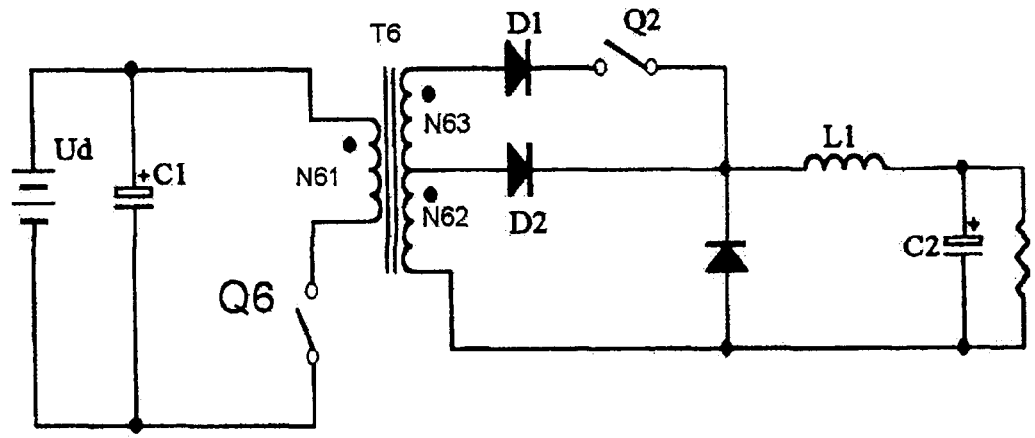
FIG. 5a is a circuit diagram of a forward DC-to-DC converter according to the seventh preferred embodiment of the present invention.
Figure 5B:
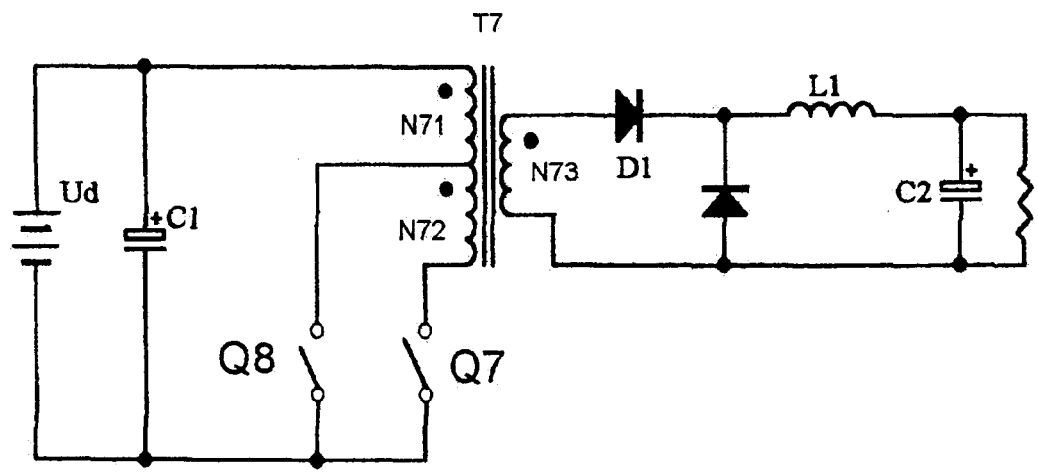
FIG. 5b is a circuit diagram of a forward DC-to-DC converter according to the eighth preferred embodiment of the present invention.
Figure 6:
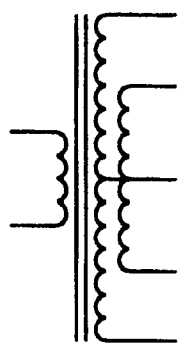
FIG. 6 is a view showing the equivalent winding construction of the transformer according to the above-mentioned preferred embodiments of the present invention.
Figure 6:
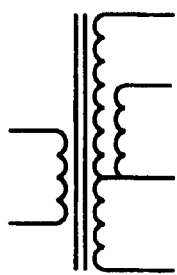
Figure 6:
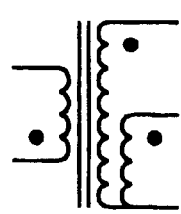
Figure 6:
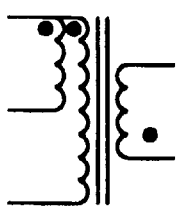
Figure 6:
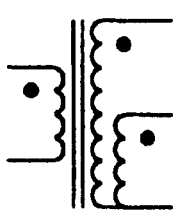
Figure 6:
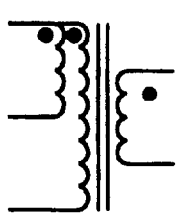

FIGS. 5a and 5b illustrate circuit diagrams of a forward DC-to-DC converter according to the present invention. The difference between the circuit diagrams of the forward DC-to-DC converter in FIGS. 5a and 5b and the circuit diagrams of the flyback DC-to-DC converter in FIGS. 4a and 4b is that the primary winding and the secondary winding have the reverse coils in the transformers T4 and T5 of the flyback DC-to-DC converter, as shown in FIGS. 4a and 4b. Nevertheless, the primary windings N61, N71 and N72 and the secondary windings N62, N63 and N73 in the transformers T6 and T7 exist forward coils respectively according to the forward DC-to-DC converter of FIGS. 5a and 5b. In addition, the equivalent winding construction of the transformers T1 to T7 according to the above-mentioned drawings of the present invention is shown in FIG. 6.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures. Therefore, the above description and illustration should not be taken as limiting the scope of the present invention which is defined by the appended claims.

What we claim is:

1. A DC-to-DC converter, comprising:
   a power supply for providing a first direct current (DC);
   a first capacitor electrically connected to said power supply for being charged by said power supply;
   a first switch assembly electrically connected to said first capacitor for converting said first direct current (DC) into a first alternating current by switching said first switch assembly;
   a transformer having a primary winding and a secondary winding for converting said first alternating current to a second alternating current, wherein said primary winding is electrically connected to said first switch assembly and said secondary winding has a tap;
   a rectifying circuit electrically connected to said secondary winding for rectifying said second alternating current to a second direct current;
   a filtering circuit electrically connected to said rectifying circuit for filtering said second direct current; and
   a range winding assembly electrically connected to said secondary winding and being one portion of said secondary winding for adjusting a turn ratio of said transformer to maintain an output voltage of said second direct current in response to a voltage drop of said first direct current.

2. The DC-to-DC converter according to claim 1, wherein said first capacitor is a filtering capacitor.

3. The DC-to-DC converter according to claim 1, wherein said first alternating current is a high frequency alternating current.

4. The DC-to-DC converter according to claim 1, wherein said tap is a central tap.

5. The DC-to-DC converter according to claim 1, wherein said rectifying circuit comprises two first rectifying diodes electrically connected to two ends of said secondary winding, respectively.

6. The DC-to-DC converter according to claim 1, wherein said filtering circuit comprises an inductor and a second capacitor electrically connected to said tap.

7. The DC-to-DC converter according to claim 6, wherein said range winding assembly comprises two subwindings electrically connected with two ends of said secondary winding, respectively.

8. The DC-to-DC converter according to claim 7, wherein said two subwindings are electrically connected with two second rectifying diodes, respectively, wherein the output ends of said two second rectifying diodes are connected together and electrically connected to said inductor of said filtering circuit.

9. The DC-to-DC converter according to claim 8, further comprising:
    a third rectifying diode electrically connected to said range winding assembly; and
    a second switch electrically connected between said third rectifying diode and said filtering circuit.

10. The DC-to-DC converter according to claim 9, further comprising a control circuit electrically connected to said second switch for controlling said second switch in response to the voltage drop.

11. The DC-to-DC converter according to claim 10, wherein said control circuit is electrically connected to said first capacitor for providing a control signal to switch said second switch in response to the voltage drop of said first capacitor when said first direct current outputted from said power supply is dropped.

12. The DC-to-DC converter according to claim 10, wherein said control circuit is electrically connected to said secondary winding of said transformer for providing a control signal to switch said second switch in response to the voltage drop of said secondary winding when said first direct current outputted from said power supply is dropped.

13. The DC-to-DC converter according to claim 1, wherein said DC-to-DC converter is one selected from a group consisting of a flyback converter, a forward converter and a half-bridge converter.

14. A DC-to-DC converter, comprising:
    a power supply for providing a first direct current (DC);
    a first capacitor electrically connected to said power supply for being charged by said power supply;
    a first switch assembly electrically connected to said first capacitor for converting said first direct current (DC) into a first alternating current by switching said first switch assembly;
    a transformer having a primary winding electrically connected to said first switch assembly and a secondary winding for converting said first alternating current to a second alternating current;
    a rectifying circuit electrically connected to a first end of said secondary winding for rectifying said second alternating current to a second direct current;
    a filtering circuit having an inductor and a second capacitor for filtering said second direct current, wherein said inductor is electrically connected to said rectifying circuit, and said second capacitor is electrically connected to a second end of said secondary winding;
    a subwinding electrically connected to said first end of said secondary winding;
    a second rectifying diodes electrically connected to said subwinding, wherein an output end of said subwinding is electrically connected to said inductor of said filtering circuit;
    a second switch electrically connected between said subwinding and said filtering circuit; and
    a control circuit electrically connected to said second switch for controlling said second switch to be turned on in order to adjust a turn ratio of said transformer to maintain an output voltage of said second direct current when the voltage of said first direct current is dropped.

15. The DC-to-DC converter according to claim 14, wherein said control circuit is electrically connected to said first capacitor for providing a control signal to switch said second switch in response to the voltage drop of said first capacitor when first direct current outputted from said power supply is dropped.

16. The DC-to-DC converter according to claim 14, wherein said DC-to-DC converter is one selected from a group consisting of a flyback converter, a forward converter and a half-bridge converter.

17. A DC-to-DC converter, comprising:
    a power supply for providing a first direct current (DC);
    a first capacitor electrically connected to said power supply for being charged by said power supply;
    a first switch electrically connected to said first capacitor for converting said first direct current (DC) into a first alternating current by switching said first switch assembly;
    a transformer having a primary winding electrically connected to said first switch assembly and a secondary winding for converting said first alternating current to a second alternating current;
    a rectifying circuit electrically connected to said secondary winding for rectifying said second alternating current to a second direct current;
    a filtering circuit having an inductor and a second capacitor, and electrically connected to said rectifying circuit for filtering said second direct current;
    a second switch having one end electrically connected to a central tap of said primary winding and the other end electrically connected to said first capacitor; and
    a control circuit for controlling said first switch and said second switch in order to adjust a turn ratio of said transformer to maintain an output voltage of said second direct current in response to a voltage drop of said first direct current outputted from said power supply.

18. The DC-to-DC converter according to claim 17, wherein said control circuit is electrically connected to said first capacitor for providing a control signal to switch said second switch in response to the voltage drop of said first capacitor when first direct current outputted from said power supply is dropped.

19. The DC-to-DC converter according to claim 17, wherein said DC-to-DC converter is one selected from a group consisting of a flyback converter, a forward converter and a half-bridge converter.

20. A method for converting direct current to direct current, adapted to be applied in a DC-to-DC converter, comprising steps of:

charging a first capacitor;

switching a first switch assembly for converting a first direct current outputted from said first capacitor into a first alternating current;

converting said first alternating current to a second alternating current via a transformer, detecting whether a voltage of said first direct current is dropped, and adjusting a turn ratio of said transformer for maintaining an output voltage of said second alternating current in response to said voltage drop;

rectifying said second alternating current into a second direct current via a rectifying circuit; and filtering said second direct current via a filtering circuit.

21. The method according to claim 20, wherein said detecting step is performed by detecting the voltage drop of said first capacitor.

22. The method according to claim 20, wherein said detecting step is performed by detecting the voltage drop of a second winding of said transformer.

23. The method according to claim 20, wherein said adjusting step is performed by increasing the number of a second winding of said transformer.

24. The method according to claim 20, wherein said adjusting step is performed by reducing the number of a primary winding of said transformer.

25. The method according to claim 20, wherein said DC-to-DC converter is one selected from a group consisting of a flyback converter, a forward converter and a half-bridge converter.

* * * * *